I. GOLDBERG.
AUXILIARY AIR INLET VALVE AND PRIMER.
APPLICATION FILED AUG. 27, 1917.

1,289,732.

Patented Dec. 31, 1918.

Witness
Chas. W. Stauffiger
Karl H. Butler

Inventor
Isadore Goldberg
By Barthel & Barthel
Attorneys

UNITED STATES PATENT OFFICE.

ISADORE GOLDBERG, OF DETROIT, MICHIGAN.

AUXILIARY AIR-INLET VALVE AND PRIMER.

1,289,732.

Specification of Letters Patent.

Patented Dec. 31, 1918.

Application filed August 27, 1917. Serial No. 188,289.

*To all whom it may concern:*

Be it known that I, ISADORE GOLDBERG, a citizen of the United States of America, residing at Detroit, in the county of Wayne and State of Michigan, have invented certain new and useful Improvements in Auxiliary Air-Inlet Valves and Primers, of which the following is a specification, reference being had therein to the accompanying drawings.

This invention relates to an auxiliary air valve for internal combustion engines, and has special reference to a device by which air or a liquid may be admitted to the fuel intake manifold of an engine, so as to enhance the combustion qualities of a fuel and thereby increase the efficiency of the engine, and increase the volume of the fuel without sacrificing power or mileage and thus save considerable fuel.

The primary object of my invention is to provide a valve of the above type that may be easily and quickly adjusted to regulate the quantity of air automatically drawn in or admitted to the intake manifold of an engine, such valve being in contradistinction to those that are automatically actuated to admit air to an engine manifold.

A further object of my invention is to provide a valve of the above type that can be easily and quickly installed in connection with the intake manifold of an engine and the dash of an automobile, the valve having provision whereby at different times various kinds of liquid may be admitted to the intake manifold of an engine, either for priming purposes or to eliminate carbon deposits in the cylinders of the engine.

I attain the above and other objects by a simple, durable and inexpensive mechanical construction to be hereinafter considered and then claimed, and reference will now be had to the drawing wherein—

Figure 1:
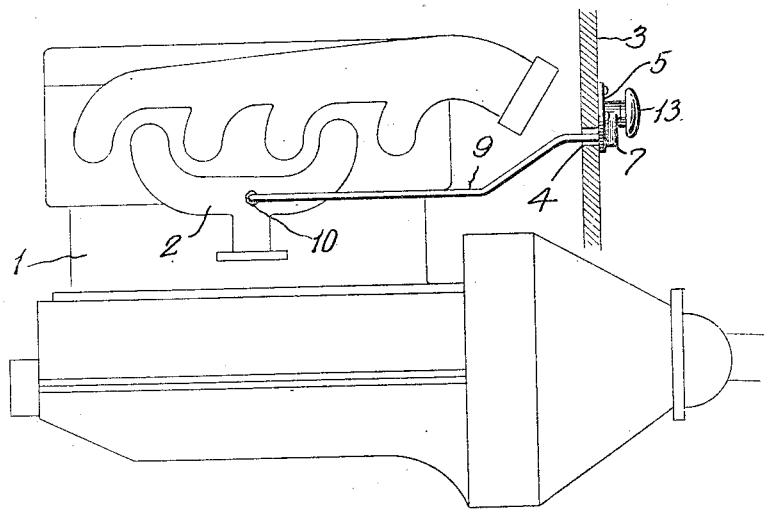
Figure 1 is a side elevation of the auxiliary air inlet valve as installed in connection with an automobile engine, and the dash of an automobile.
Figure 3:
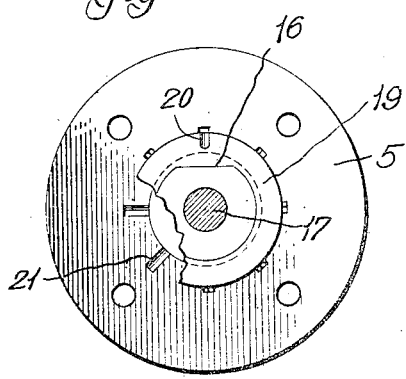
Fig. 3 is a rear elevation of the valve, partly broken away and partly in section.
Figure 4:
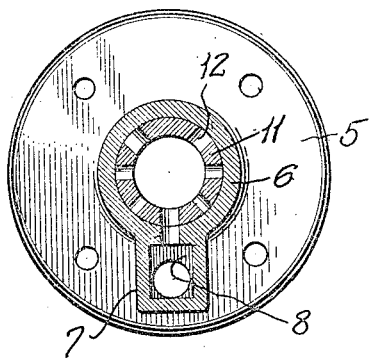
Fig. 4 is a cross sectional view of the valve.

As illustrating an installation of the auxiliary air inlet valve, I have diagrammatically shown an internal combustion engine having an intake manifold 2, and adjacent the engine is a dash or suitable support 3 provided with an opening 4.

Suitably connected to the dash or support 3 is the circular face plate 5 of a cylindrical stationary member 6 which has the lower side thereof provided with an enlargement 7 having an angle port 8, the lower end of which has the walls thereof screwthreaded so as to receive the exteriorly threaded end of a tube or conduit 9 extending to and tapped into the manifold 2. It is preferable to arrange the stationary member of the valve at such a height that liquid admitted to said member will flow by gravity to the intake manifold 2.

Rotatable in the stationary member 6 is a hollow valve plug 11, which in its preferred form, has a series of circumferential openings 12 of various size adapted to register with the angle port 8 in the enlargement 7 of the member 6. The outer end of the plug 11 terminates in a knob or handle 13 by which the valve plug may be easily rotated or adjusted, and said knob abuts the outer end of the cylindrical valve member or body 6 and has a slot or passage 14 communicating with the series of apertures 12 in said plug. The inner end of the plug 11 is reduced to provide an annular shoulder 15 having a facet 16, also to provide a stem 17 for a nut 18. Mounted on the shoulder 15 is a disk shaped locking member 19 held against rotation by the facet 16. The locking member 19 has the periphery thereof provided with a depressed portion forming a tooth 20 and this tooth is adapted to engage in radially disposed grooves 21 provided therefor in the face plate 5. Engaging the locking member 19 is a washer 22 on the stem 17 and a coiled compression spring 23 encircles said stem between the nut 18 and said washer. The expansive force of the spring 23 will hold the washer 22 against the locking member 19 and said locking member will prevent accidental rotation of the valve plug 11, yet permit of said valve plug being manually adjusted. When the valve plug 11 is turned, the washer 22 and the locking member 19 recedes sufficiently to permit of the tooth 20 sliding out of one groove and into another, the grooves 21 being positioned so that either of the apertures 12 of the valve plug may register with the angle port 8 in the enlargement 7.

From the foregoing, it will be observed that the valve plug 11 may be adjusted so that the quantity of air drawn therethrough by suction or reduction of atmospheric pressure in the manifold 2 may be regulated, and may be completely shut off. Besides the passage 14 admitting air to the valve plug, said air passage permits of liquid being placed in the valve plug to flow by gravity into the manifold 2 and be eventually carried into the cylinders of the engine, and such liquid may be used as will eliminate carbon deposits in the engine cylinders and about the valves thereof.

Figure 5:
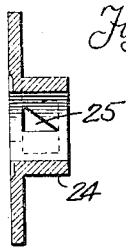
Fig. 5 is a longitudinal sectional view of a stationary member of the valve.
Figure 2:
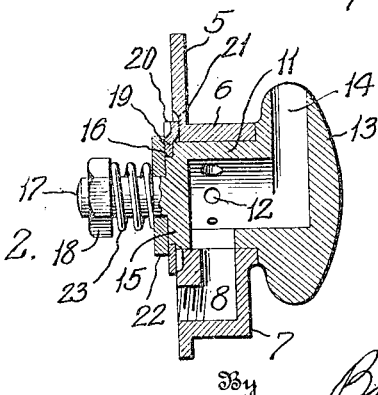
Fig. 2 is a longitudinal sectional view of the valve.
Figure 6:
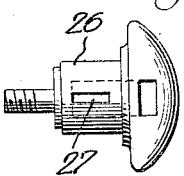
Fig. 6 is a plan of the detached valve plug, illustrating a slight modification of the invention.

In Fig. 5, there is shown a valve body or member 24 having a triangular shaped port 25 and a valve plug 26, such as shown in Fig. 6, may be placed in the valve member body 24. The valve plug 26 has a single slot 27 adapted to register with the port 25 and the relation between the port 25 and the slot 27 permits of a very fine or minute adjustment being obtained for admitting air to the valve.

It is thought that the utility of the auxiliary air inlet valve will be apparent without further description, and while in the drawings there are illustrated the preferred embodiments of my invention, it is to be understood that the structural elements are susceptible to such variations and modifications as fall within the scope of the appended claim.

What I claim is:—

An auxiliary air inlet valve for an internal combustion engine, comprising a face plate adapted for attachment to an automobile dash and provided with a central opening, the rear face of said plate having radial grooves at the opening thereof, a valve body carried by said face plate and having the lower side thereof provided with a ported enlargement adapted to communicate with the intake manifold of an engine, a hollow valve plug in said valve body provided with a series of apertures adapted to register with the port in the enlargement of said valve body, said valve plug extending into the opening of said face plate, a knob carried by the outer end of said plug and provided with a passage communicating with the apertures of said plug, a locking member fixed on the inner end of said plug for rotation therewith and adapted to spring into and out of the grooves of said face plate, and means on the inner end of said plug holding said locking member normally against said face plate.

In testimony whereof I affix my signature in the presence of two witnesses.

ISADORE GOLDBERG.

Witnesses:
 ANNA M. DORR,
 KARL H. BUTLER.

Copies of this patent may be obtained for five cents each, by addressing the "Commissioner of Patents, Washington, D. C."